Dec. 19, 1950 C. L. BROWN 2,534,224
CRYSTAL CHECKING DEVICE
Filed April 6, 1945
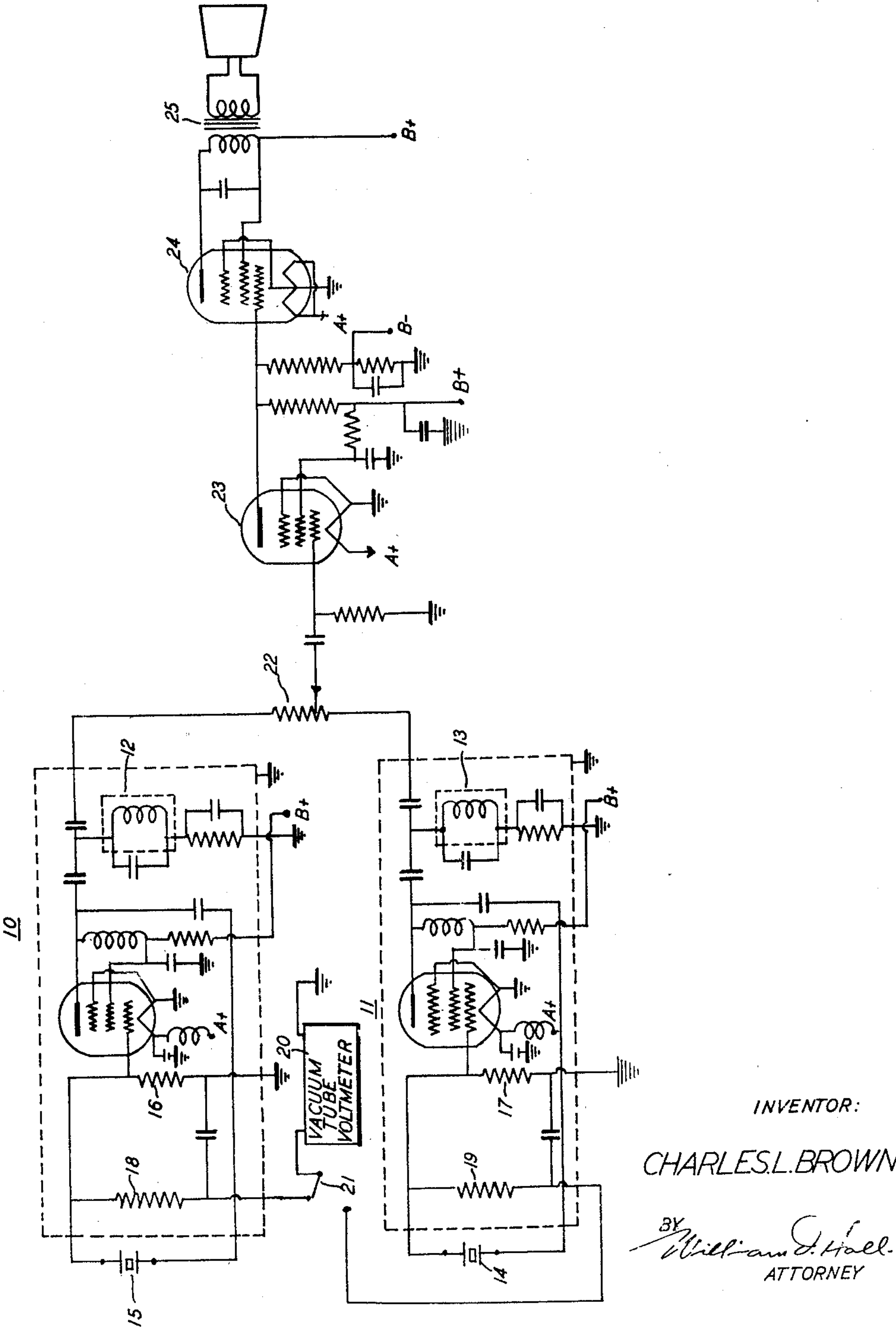
INVENTOR:
CHARLES L. BROWN
BY William D. Hall
ATTORNEY Patented Dec. 19, 1950

2,534,224

UNITED STATES PATENT OFFICE 2,534,224

CRYSTAL CHECKING DEVICE

Charles L. Brown, Rockford, Ill.

Application April 6, 1945, Serial No. 587,002

1 Claim. (Cl. 175—183)

(Granted under the act of March 3, 1883, as amended April 30, 1928; 370 O. G. 757)

The invention described herein may be manufactured and used by or for the Government for governmental purposes, without the payment of any royalty thereon.

This invention relates to radio test equipment, and more particularly, to a device for checking piezoelectric crystals.

It is an object of my invention to provide a crystal checking device that will compare a crystal under test with a standard crystal as to frequency and activity within a predetermined allowance.

It is another object of my invention to provide a crystal checking device that will be light, compact, and inexpensive.

It is still another object of my invention to provide a crystal checking device that will test the activity of a piezoelectric crystal under conditions similar to those appearing in an operative radio circuit.

These and other objects and advantages will become more apparent when the following specification is read in connection with the accompanying drawing in which is disclosed a circuit diagram of one embodiment of the invention.

Referring to the circuit diagram shown in the drawing, it is seen that the reference numerals 10 and 11 refer to two identical crystal oscillator circuits of the Pierce type, having plug-in inductances 12 and 13 so that the plate circuit of each oscillator circuit may be tuned to any desired harmonic of the original crystal frequency.

The oscillator circuit 11 is the standard Pierce oscillator circuit and includes a crystal 14 of a known frequency. The plate circuit is tuned to the harmonic of the frequency at which the crystal under test will be utilized by means of the plug-in inductance 13.

The other crystal oscillator circuit 10 which includes an unknown crystal 15 is identical electrically and mechanically to the crystal oscillator circuit 11. The crystal 14 is chosen so that it is near the same frequency of that which the unknown crystal 15 is supposed to be. The device will measure the activity of the crystal by measuring the voltage drop across the grid resistors 16 and 17 in the oscillator circuits 10 and 11 through the isolating resistors 18 and 19 respectively. The lower the activity of the crystal the lower will be the grid current drawn by the oscillator tube. The greater the activity of the crystal, the greater the voltage drop across the grid resistors 16 and 17 respectively. This voltage drop may be measured by a vacuum tube voltmeter 20 having a single pole double throw switch 21, which may selectively connect the isolating resistor 18 or the isolating resistor 19 to the vacuum tube voltmeter 20.

The two resultant frequencies of the plate circuit of the oscillator circuits 10 and 11 are combined and mixed in mixing resistor 22. The resultant beat frequency signal is then fed into an audio amplifier, which in the illustrated embodiment includes amplifier tubes 23 and 24. The input of the audio amplifier is tuned to a sharp cut off at a predetermined frequency. This frequency may be, for example, approximately 1000 cycles. The cutoff frequency should be selected at that value over which there would be an undesirable difference in the final selected operated frequency of the circuit in which the crystal 15 is to be used. The resultant beat frequency after being amplified, is then fed into a loud-speaker 25. The tone heard in the loud-speaker 25 will be within the chosen cutoff range of the audio amplifier which, for example, was chosen at 1000 cycles, providing the crystal under test 15 is within the desired limits.

The actual frequency of the crystal 15 may be found by supplanting the known crystal 14 until no beat frequency is audible in the loud-speaker 25.

It is thus seen that I have provided a crystal checking device that will test the activity of a crystal by matching it with a known or standard crystal as to frequency and activity within a certain pre-determined allowance, the device being light, compact and operative under conditions which closely approximate the actual operating conditions under which the unknown crystal is to be used.

While I have shown and described one embodiment of my invention, it is obvious that many changes and modifications may be made by those skilled in the art that will fall within the scope of the invention.

Having thus described my invention, what is claimed is:

A crystal checking device comprising a first crystal oscillator circuit which includes an electron tube comprising cathode, grid and anode electrodes, a piezo-electric crystal of known frequency connected to the grid of the first tube, and a grid resistor connected to the grid of the first tube, a second crystal oscillator circuit which includes an electron tube comprising cathode, grid and anode electrodes, a piezo-electric crystal of unknown frequency connected to the grid of the second tube, and a grid resistor connected to the grid of the second tube, a vacuum tube voltmeter selectively connected across either grid resistor to indicate the voltage drop thereacross as a measure of crystal activity, a mixing resistor connected in the output of both oscillator circuits, an audio amplifier connected to said mixing resistor, and a transducer coupled to the output of said audio amplifier for audibly indicating the resultant beat frequency signals.

CHARLES L. BROWN.

REFERENCES CITED

The following references are of record in the file of this patent:

UNITED STATES PATENTS

| Number | Name | Date |
|---|---|---|
| 1,649,828 | Hund | Nov. 22, 1927 |
| 2,110,082 | Granger | Mar. 1, 1938 |
| 2,143,864 | Conklin | Jan. 17, 1939 |
| 2,212,431 | Bly | Aug. 20, 1940 |
| 2,240,452 | Wolfskill | Apr. 29, 1941 |

OTHER REFERENCES

High Frequency Measurements, by Hund; McGraw-Hill Book Co., Inc., pages 428–431.

Bell Laboratories Record, vol. XXII, Number XII, August 1944, pages 477–480.

"Radio," Feb. 1944, pages 26–29.